US007196631B1

(12) United States Patent
Dziekan et al.

(10) Patent No.: US 7,196,631 B1
(45) Date of Patent: Mar. 27, 2007

(54) METHOD OF UTILIZING EXISTING FIRE ALARM SYSTEMS AND EXISTING SMOKE DETECTORS TO DETECT AEROLIZED RADIOACTIVE MATERIAL

(76) Inventors: Michael Dziekan, 1081 New Haven Rd., Unit 10-I, Naugatuck, CT (US) 06770; Joseph Bango, 40 Alston Ave., New Haven, CT (US) 06515

( * ) Notice: Subject to any disclaimer, the term of this patent is extended or adjusted under 35 U.S.C. 154(b) by 0 days.

(21) Appl. No.: 10/871,248

(22) Filed: Jun. 17, 2004

Related U.S. Application Data

(60) Provisional application No. 60/480,281, filed on Jun. 20, 2003.

(51) Int. Cl.
*G02T 1/18* (2006.01)
*H01J 47/00* (2006.01)
*G08B 17/10* (2006.01)

(52) U.S. Cl. ........................ 340/628; 340/629; 250/380

(58) Field of Classification Search ........... 340/539.22, 340/539.26, 577–579, 600, 999, 627–629; 250/380–389

See application file for complete search history.

(56) References Cited

U.S. PATENT DOCUMENTS

| | | | | |
|---|---|---|---|---|
| 3,749,915 | A * | 7/1973 | Hagood et al. | 250/336.1 |
| 3,964,036 | A | 6/1976 | Adachi et al. | |
| 4,097,851 | A * | 6/1978 | Klein | 340/628 |
| 4,176,311 | A | 11/1979 | Davis | |
| 4,213,047 | A * | 7/1980 | McCord | 250/381 |
| 4,266,219 | A * | 5/1981 | Foster et al. | 340/630 |
| 4,644,167 | A * | 2/1987 | Sorber | 250/374 |
| 4,818,884 | A * | 4/1989 | Saubolle | 250/388 |
| 5,153,520 | A * | 10/1992 | Dumbeck | 324/469 |
| 5,856,784 | A * | 1/1999 | Wiemeyer | 340/629 |
| 2004/0031928 | A1* | 2/2004 | Smith | 250/380 |
| 2004/0135095 | A1* | 7/2004 | Holmquist | 250/389 |

* cited by examiner

*Primary Examiner*—Daniel Wu
*Assistant Examiner*—Jennifer Mehmood

(57) ABSTRACT

A method of utilizing existing fire panel infrastructure to fight terrorism. The fire alarm systems ionization type smoke detectors, in addition to detecting the presence of smoke, would also detect the presence of airborne radioactive particles by effecting only a minor software modification. This enhanced detection ability will enable existing fire panels, as well as standalone residential smoke detectors, to detect the presence of radioactive particles such as those that would be indicative of a deliberate terrorist attack from a "Dirty Bomb" or "Dirty Aerosol" release, or an non-intentional release of radioactive particles due to an accident or natural disaster.

4 Claims, 4 Drawing Sheets

METHOD OF UTILIZING EXISTING FIRE ALARM SYSTEMS AND EXISTING SMOKE DETECTORS TO DETECT AEROLIZED RADIOACTIVE MATERIAL

CROSS REFERENCE TO RELATED APPLICATIONS

Provisional Application No. 60/480,281 was filed on 20 Jun. 2003.

BACKGROUND

1. Field of Invention

This method of detection relates in general to anti-terrorism, and specifically to radioactive particle detection. The described invention will allow an existing building smoke/fire detection infrastructure to have enhanced usage for determining the presence of "dirty bomb" radioactive particle fallout. A "dirty bomb" is a low tech way of terrorist or adversarial groups to cause mass disruption by releasing low level radioactive particles into the air that are capable of causing public panic, contamination of buildings, real-estate, and sickness or death in humans and animals. The release can be abrupt and energetic, such as an explosive surrounded by low-level radioactive medical or nuclear waste, or slow and subtle by aerosolizing a low-level radioactive powder. By using real time readings of chamber values of commercially available ionization type smoke detectors in a new and novel way, one can indicate the presence of radioactive particles indicative of an accidental or intentional release of radioactive contaminates.

2. Background Description of Prior Art

In the case of smoke detection by an ionization smoke detector, a radioactive source producing ion pairs is used. They take advantage of the ion pairs created by ionizing radiation to develop a low, but measurable electrical current between two plates with a small voltage differential between them. This current is typically in the range of picoamps ($10^{-12}$ Amps). Smoke particles entering the chamber (single or dual chamber design) decrease the current between the two plates and trigger the detector's alarm. Current fire alarm systems (or even the detector itself) have intelligent algorithms that will compensate for a detector chamber getting dirty over time and compensate for long term changes in chamber threshold. This will reduce the likelihood of a false alarm, and help to prevent an even worse scenario—no alarm when there is a real fire! All current methodologies rely on the fact that when smoke particles enter the ionization chamber, the small constant current that is present in the chamber will decrease to indicate the presence of smoke particles and indicate a fire. The amount of ionizing radiation, albeit small, will remain constant, only the current will decrease. The intent of this invention, is that when a "dirty bomb" is exploded or aerosolized radioactive particles are released into the atmosphere in what will most likely be a large metropolitan area (if terrorism is involved), a method of indication can be realized to warn building occupants that there is a quantity of harmful radioactive particles in the air. The software modification to the fire alarm panel will be the addition of a new alarm (possibly called "Radiation Alarm", "Radioactive Particle Alarm", or whatever else is decided) that will be sounded if one or more (preferably a group of) detectors indicate a rapid increase (several seconds to several minutes) in ionization chamber current, due to the presence of radioactive particles. The radiation from the particles will increase the limited but constant ionization produced by the detectors own ionization source. The alarm can cause specific events to be triggered from the fire panel; such as, closing outside air dampers, and turning off ventilation fans to minimize the amount of dispersion of radioactive particles that would be introduced into the building ventilation system.

DETAILED DESCRIPTION OF THE INVENTION

Figure 1:
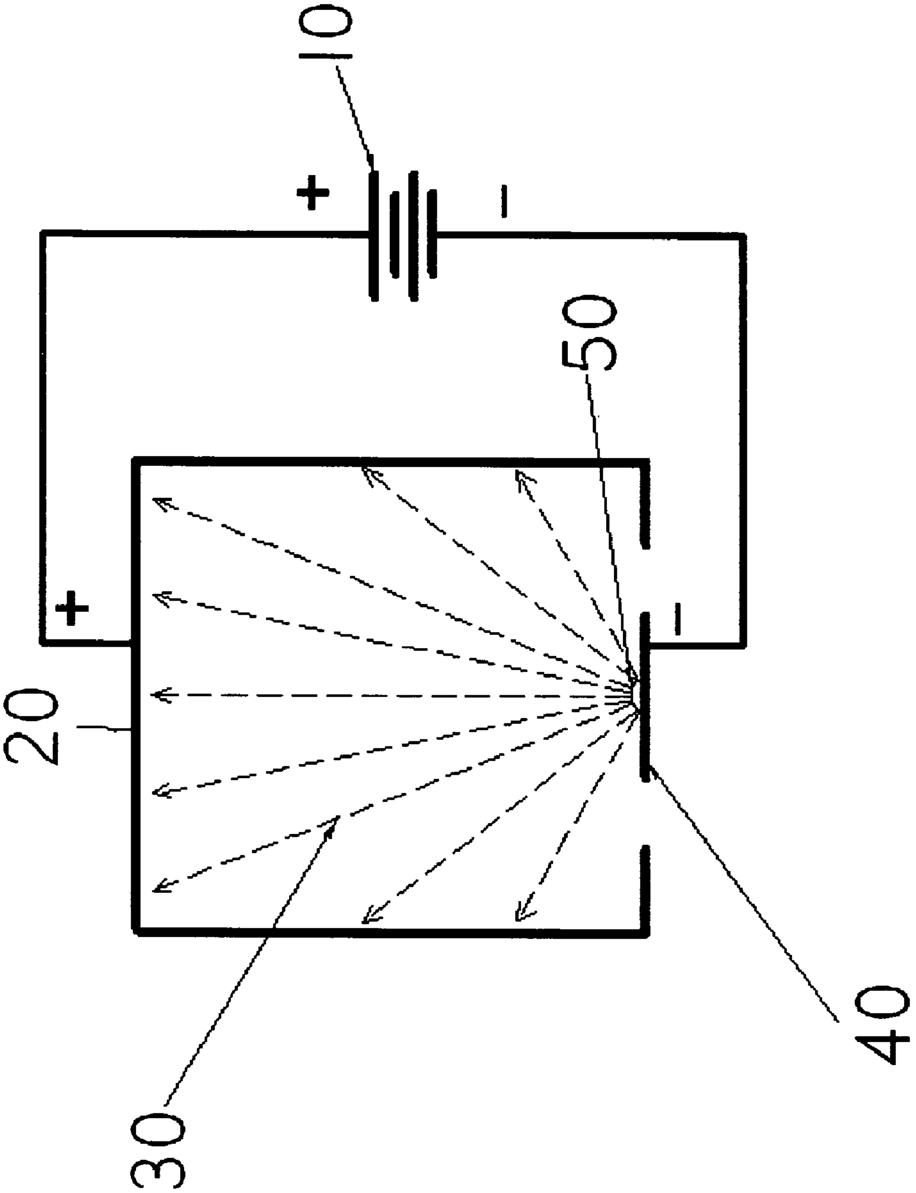
FIG. 1 shows a schematic representation of an ionization chamber that would be used in a commercial/residential ionization type smoke detector. The chamber shows only the radiation pattern that would be encountered with no smoke particles or ions.

In Commercial Fire systems, there are two main types of panel operation, addressable, and non-addressable. Addressable refers to the ability of the fire panel to individually query smoke detectors and modules (Note—Since we are only interested in the operation of smoke detectors, we will not mention the usage of modules). For example, a series of smoke detectors could be connected to the main communication line (usually referred to as an SLC, or Signaling Line Circuit) that provides not only communication, but also power. If one hundred detectors are connected to this SLC line, then they can be individually addressed from number one to number one hundred. The number one hundred is not set as a limiting factor, but merely used for an example as different fire panels have different capabilities. The maximum number of detectors or modules will depend on a variety of factors, such as wire length, gauge, impedance, detector current draw, SLC connection style, etc. The individual smoke detectors are usually addressed manually by the installer by setting a pair of rotary switches to the desired address. As the fire panel queries detector number one, the detector will send back its chamber value to be read by the fire panel. The fire panel will then look at this information, convert it, and determine if the reading is high or low. If the reading is high, that means that smoke, or more accurately, particulates impeding the ionic current flow in the ionization chamber are present inside the chamber. The fire panel can then process the information through a suitable algorithm to determine if the system should report a dirty chamber, maintenance condition, alert condition, warning condition, or full alarm condition. There may be a point of confusion that needs to be clarified. In the beginning of this invention description, it was mentioned that when smoke or particulates enter the ionization chamber of the smoke detector that the ionization current would decrease. This is a true statement, however intelligent smoke detectors have internal circuitry that will perform some minimal amount of processing. The resulting signal sent to the fire panel resulting from the decrease in ionization chamber current (due to smoke or particulates) would be an increased value. The greater the amount of smoke or particulates inside the smoke detectors ionization chamber, the lower the ionization chamber current, and the higher the chamber value that will be reported back to the fire panel. As an example, assume that a particular smoke detectors ionization chamber is free from any smoke or particulates. The ionization chamber current will be at some current level that will be converted to a chamber value that will be sent to the fire panel via. the fire panels SLC line. This value of ionization chamber current will be established as "normal", or "smoke free". If smoke or similar particulates are introduced into the smoke detectors ionization chamber, then the ionization chamber current value will decrease proportionately by the concentration of smoke or particulates inside the ionization chamber. The internal circuitry will then take this low ionization chamber current value, and convert it to a higher value to be sent to the fire panel. The conversion could be a bit setting if wireless detectors are used, current values encoded on the SLC line or voltage levels encoded onto an SLC line depending on the fire system. If you were to read in a digital representation of the smoke detectors ionization chamber current value at the chamber internal to the smoke detector, the value would decrease proportionately with the concentration of smoke or particulates introduced into the ionization chamber, while the digital value, would increase internal to the fire panel. In simple terms, as the ionization chambers current decreases, the "chamber value" reported to the fire panel increases, likewise, as the ionization current increases from its previously low state due to the presence of smoke or particulates, the "chamber value" reported back to the fire panel decreases. As an example, a normal (no smoke) operating ionization smoke detector could give a value of zero or some value below twenty at the fire panel. This would actually correspond to a high value of current inside the smoke detectors ionization chamber itself. When smoke or particulates are introduced into the ionization chamber, the ionization chamber current value will decrease proportionately with the concentration of smoke particles inside the chamber. This decrease in ionization chamber current would be indicated in the fire panel as an inversely higher value, say fifty or sixty. If the concentration of smoke is increased even more inside the smoke detectors ionization chamber, then the ionization chambers current will further decrease, and the result at the fire panel will be an even more higher chamber value, say seventy to eighty. This is the basis for an addressable fire system to differentiate a warning or alert condition from that of an actual alarm condition.

In a non-addressable fire panel, the smoke detectors are typically connected to a common or shared input circuit referred to as an input "zone" and powered by an additional set of two wires. Instead of a simple two-wire connection as in the addressable system, we now have four wires, two for the input circuitry connection, and two for power connection to operate the non-addressable smoke detectors. When the non-addressable smoke detector senses the presence of smoke or particulates inside its ionization chamber, the ionization current will decrease as in the previously described case of the addressable fire system, however there will not be any "chamber value" information sent to the fire panel. The non-addressable smoke detector will short the two input "zone" connections, and the fire panel will respond with an immediate alarm condition. The shorting is typically done with a small mechanical relay, in this fashion, any or all the detectors connected to the input zone could indicate an alarm state, the drawback is that you don't know which individual detector went into alarm, but only that a certain input zone is in alarm. I must point out that there are typically LED's (Light Emitting Diodes) built in to the smoke detectors housing that will indicate an alarm condition, but you would have to walk around the building and visually identify each detectors condition. The ionization chamber will function exactly as before, however, the resulting chamber value range of values will not be available to the fire panel. An additional drawback of a non-addressable system is the fact that you cannot "map" certain detectors to specific parts of a building, just an entire zone of non-addressable smoke detectors.

In an addressable system, you could map individual detectors to a graphical floor plan, or computerized floor plan to be displayed from the computer video monitor. If detector one indicates an alarm condition, then a label could be displayed along with the alarm condition, such as "ALARM (Smoke): Main Lobby East", or "ALARM (Smoke): Pump Room". This gives quick information as to the affected locations of the protected premises that are indicating smoke or fire. The most important concept to be grasped here is that in all cases where the ionization chamber values change with the increased concentration of smoke or particulates, the ionization chamber current always decreases with smoke or particulates. The ionization chamber current value will always be at its maximum or highest value when there is no smoke or particulates inside the ionization chamber. There could be a small amount of dirt that will buildup over time, or a gradual weakening of the ionization potential from the radioactive source that will cause some degradation of ionization current. Virtually every intelligent commercial fire panel will compensate for this slow decrease in ionization current with a specific ionization chamber compensation algorithm. The algorithm will enable a "normal" baseline value to be established, and any sudden decrease in ionization current (and resulting increased "chamber value" read in by the fire panel) below this value will constitute a warning or alarm condition. This type of adjustable baseline algorithm prevents many false alarms from happening that could result from a "normal" no smoke condition. I must point out that this baseline determination is a slow and gradual process, if it reacted too quickly to any decrease in ionization chamber current, then it would most likely miss any true alarm condition. A brand new smoke detector installed on an intelligent fire panel might have a "normal" (i.e. no smoke) chamber, for the sake of argument, a value of ten. After one year, the same smoke detector might have a "normal" chamber value (when read from the fire panel) of, for the sake of argument, twenty-nine. If the alarm threshold were set at a constant value of twenty-nine, then this smoke detector would be indicating an alarm condition where there is none! This would constitute a false alarm. If the ionization chamber compensation algorithm compensates for this slow and gradual decrease in ionization current and subsequent increase in chamber value (when read from the fire panel), then the alarm point could be set nineteen points above normal. Instead of a false alarm sounding, the new alarm value, or adjusted alarm value would be twenty-nine plus nineteen, or forty-eight. All these things help to improve fire panel operation and reduce the number of subsequent false alarms. What no one has ever thought about, is what happens if the smoke detector ionization current increases. Before Sep. 11, 2001, with the attack on the World trade center buildings, this result would always have been treated as a bad detector or indicated a defective smoke detector. With recent attacks by terrorists on America and throughout the world, especially the threat of "dirty bombs", an increase in smoke detector ionization current would mean that there is an increase of radioactive particles inside the ionization chamber. This increase in ionizing radioactive particles, such as those released by the explosion of a dirty bomb, or as a result of silently releasing aerosolizing radioactive particles, will cause the amount of ionized air molecules to increase, and hence, the ionization chamber current to increase. The only possible way for the ionization current to increase, is that the radioactive source has increased in strength (become more radioactive), the gaseous mixture inside the ionization chamber has been changed from air, to some other type of gas, or the atmospheric pressure has greatly increased. The first two conditions are highly unlikely, and the last condition will not cause a problem to the ionization type smoke detector when a dual chamber ionization type smoke detector is used. The only logical reason left for an increase in ionization chamber current is that excess or extra radiation is present inside the ionization chamber. Since Alpha radiation will only travel a few centimeters in air before being stopped, it would mean that a radioactive particle emitting Alpha radiation has been introduced into the ionization chamber. Unlike Alpha radiation, radioactive particles can travel large distances (several feet to several thousand yards) and this means that the ionization detector could indirectly be capable of detecting radiation by detecting radioactive particles. The same is true for radioactive particles that emit Beta and Gamma radiation. Beta radiation will travel much further in air than will Alpha radiation, and Gamma still further, however Alpha radiation has a greater ionizing effect on air. The described invention will not detect radiation emitted from a dirty bomb or radioactive aerosol per say, but it will detect the additional ionization produced by the introduction of radioactive particles released from a dirty bomb or radioactive aerosol. As mentioned earlier, the Alpha radiation can only travel a short distance before being stopped, with the Beta able to travel still further, and Gamma the furthest. This would make it very unlikely that the ionization chamber would detect the radiation released from a dirty bomb or radioactive aerosol. With the released radioactive particles introduced into the ionization detectors ionization chamber, the distance is now only a few centimeters. Now the additional ionization produced by the excess of radioactive particles inside the ionization chamber will cause an increase from the normal (non smoke) value of ionization current to an increased value that would never be seen if not for the additional radiation because of the additional radioactive particles present inside the ionization chamber. This ability for radioactive particles to increase the ionization chambers ionization current is the basis for the described invention. A key point is that the described invention will detect the presence of radioactive particles, not radiation!

As mentioned earlier, there could be a case where the ionization current could artificially increase due to atmospheric conditions, such as increased atmospheric pressure. This is because the increased atmospheric pressure will also mean a higher density of air molecules present inside the ionization chamber will slightly increase ionization current. If there are more air molecules to be ionized, then there will also be more ion pairs produced, which in turn mandates a greater ionization current, albeit slight but measurable. If an atmospheric condition causes an increased ionization current, then it will be a large-scale event, and every ionization detector will respond in kind. If all the ionization detectors have an increase in ionization current, then it will most likely be an atmospheric event. A dual chambered ionization detector will be less affected by this atmospheric change, and therefore more reliable as an indicator of detection for radioactive particles. It must be noted that both single and dual chambered ionization detectors will work for this application. In the preferred embodiment of the invention, the dual chamber ionization chamber will be utilized. It may be of additional benefit to have an atmospheric monitor for determining barometric pressure attached to the fire system. The data from the barometric sensor could be correlated with the chamber values of the ionization type smoke detectors to determine if a system wide increase of ionization current is a result of radioactive particles or only an atmospheric pressure change. The radioactive source used in ionization smoke detectors is an oxide of Americium 241, a known Alpha emitter. Alpha radiation is composed of a helium nucleus, i.e. a helium atom with its two electrons stripped off. Alpha radiation has very little penetration power; a few centimeters of air or a sheet of paper easily block it. If alpha radiation were released from a source, then the radiation would only travel a few centimeters, however, if a radioactive particle were released into the air, it would then be detected if it were to be introduced into the smoke detectors ionization chamber based upon the described invention. It is radioactive particles that would be released into the atmosphere if a dirty bomb were to be exploded. The small particles could potentially travel many hundreds of feet or even thousands of feet from the point of origin. If a radioactive powder were aerosolized from a moving vehicle, such as a car, bike, boat, or plane, then the particles could potentially travel many miles, and contaminate an area of tens of square miles. It is these particles that the described invention seeks to detect.

FIG. 1 shows an ionization smoke detectors ionization chamber. A small radioactive source 50 (typically Americium 241) is placed in a cylindrical metal ionization chamber 20 that causes radioactive particles to interact with ambient air let in through a small opening, to produce ions of air. A stream of radioactive particles 30 is emitted from the radioactive source 50. A small voltage source 10 is connected to opposing sides of the ionization chamber to create a potential difference across the chamber. There is a positive side 20 and a negative side 40. The two polarities are separated to prevent any short from occurring between the two.

Figure 2:
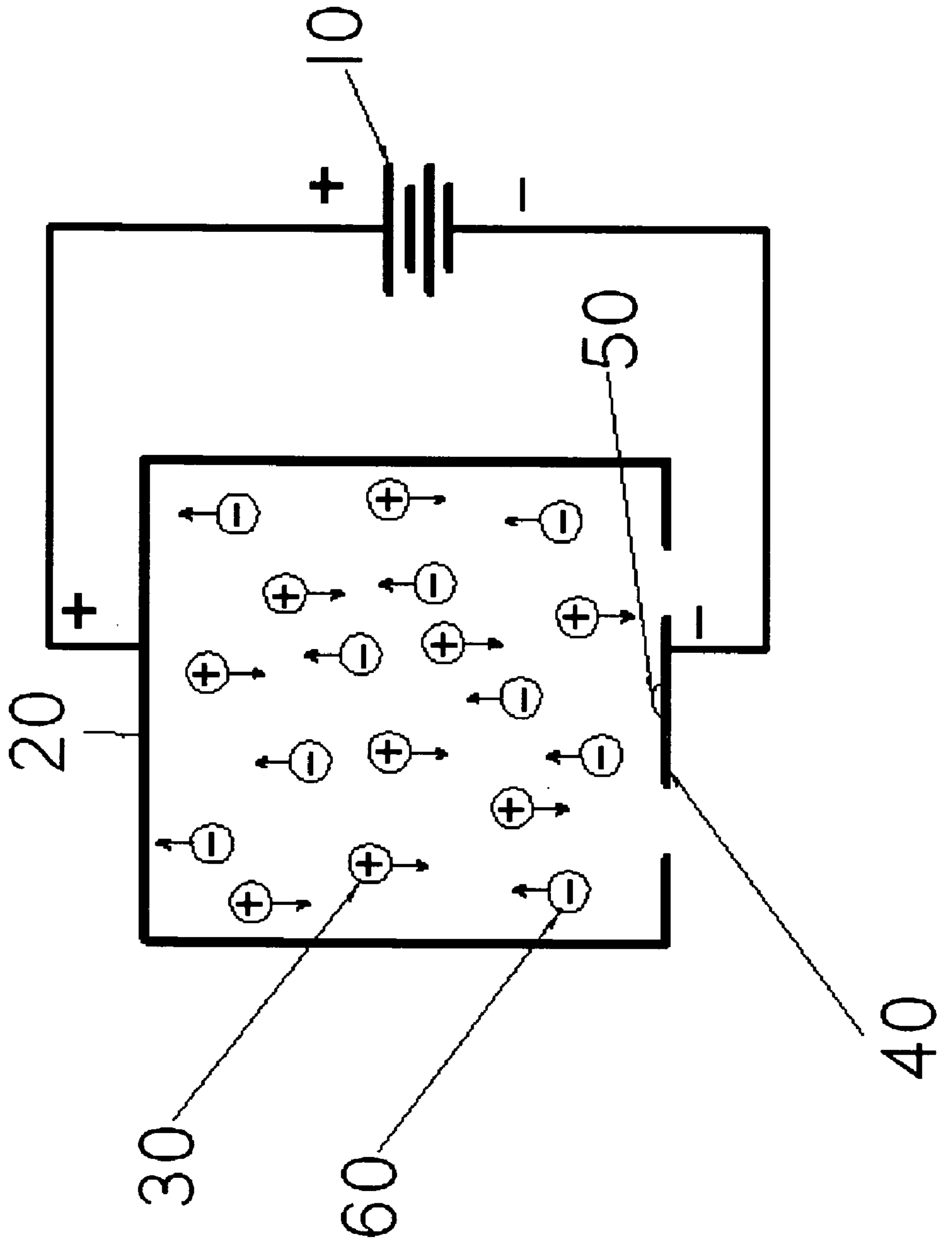
FIG. 2 shows a schematic representation of the ionization chamber indicating the presence of ions caused by interaction between the ionizing radiation and the air molecules present in the chamber. The ions are causing a small but measurable steady current to be produced in the smoke detectors ionization chamber.

FIG. 2 shows that ions of air are produced from the interaction of the ionizing radiation produced by the radioactive source 50. The ions will have a mix of positive 30 and negative 60 ions (electrons). Due to the presence of the voltage source 10, there will exist an attraction for the positive 30 ions to head towards the negative plate 40, and an attraction for the negative 60 ions (electrons) to head towards the positive 20 plate. This attraction will cause a small current to develop (typically picoamps $10^{-12}$ amps) and can then be measured quite easily. The steady presence of current indicates that nothing is interfering with the ions, i.e. no smoke/combustion products are present in the detector ionization chamber.

Figure 3:
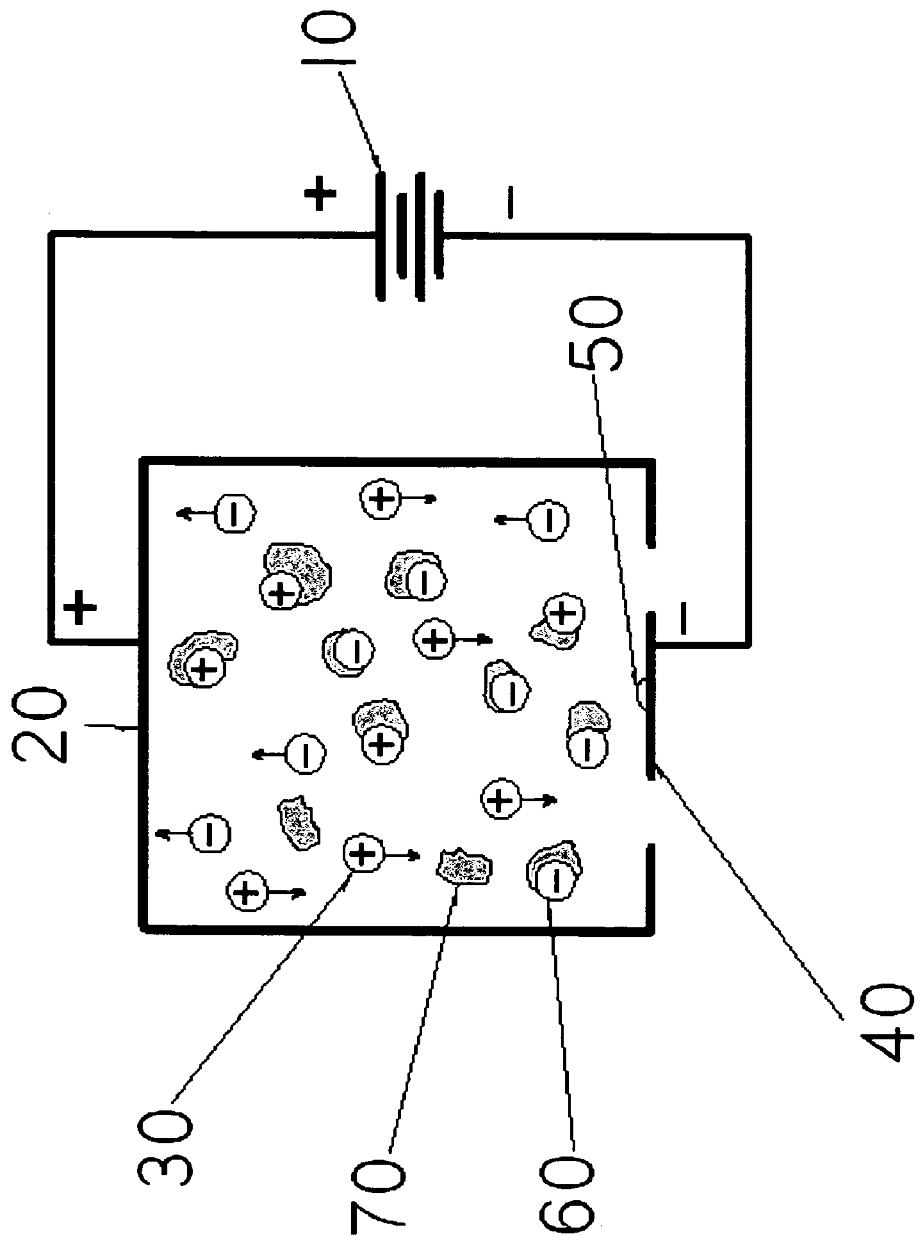
FIG. 3 shows a schematic representation of the ionization chamber with the introduction of smoke particles. The smoke particles cause the ions to collect on them and thereby reduce the amount of ionization current.

FIG. 3 indicates the presence of smoke/combustion products 70 that are introduced into the detector ionization chamber. As the large smoke/combustion particles interact with the positive 30 and negative 60 air ions, the amount that is left to make up the current flow is decreased, and hence, the current is also decreased. This reduction of current is an indication of the presence of smoke/combustion products, and a subsequent alarm or warning is sounded based on either the detectors alarm threshold values, or the fire alarm panel's internal programmable alarm threshold values. All current ionization detectors make use of the fact that a reduction of current will indicate the presence of smoke/combustion products, and subsequently, a fire. This makes sense because the amount of ionizing radiation inside the chamber produced by the radioactive source 50 does not change (aside from some decrease due to aging). There will be a slow decrease in emitted ionizing radiation over a period of tens of years (the half-life for Americium is on the order of 432 years).

Figure 4:
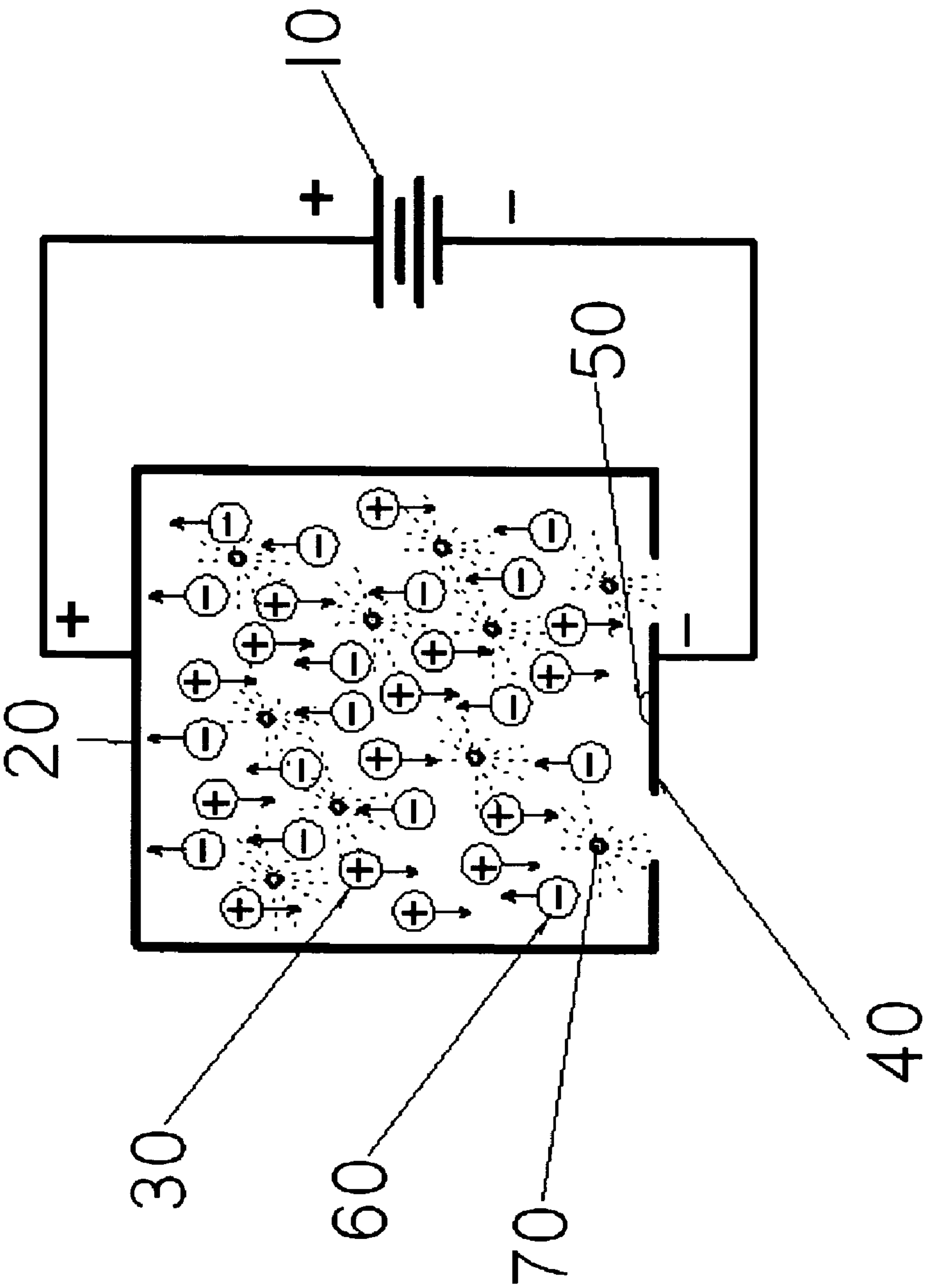
FIG. 4 shows a schematic representation of the ionization chamber with the absence of smoke/combustion particles but showing the introduction of ionizing radioactive particles into the ionization chamber. The ionizing radioactive particles would cause the baseline ionizing chamber current to increase as opposed to decreasing, as would happen in the presence of combustion/smoke products. This increase would indicate an alarm condition.

FIG. 4 shows the basis of the invention. The ionization chamber is free from any smoke/combustion products, and contains the normal positive 30 and negative 60 air ions; the difference is that now there is introduced into the chamber, small particles of radioactive substances 70. These radioactive particles 70 could be the result of an accidental release of low level nuclear material into the atmosphere, or the deliberate attempt of a terrorist organization to cause mass disruption by the explosion of a so called "dirty bomb". The presence of the additional radioactive particles 70 will increase the amount of ionization of the air inside the chamber that will be ionized into negative 60 and positive 30 ions. This resultant increase in the amount of ions will cause a measurable increase in the ionization chamber current, and could thereby issue a radiation alarm or radiation warning condition, either directly by an audible and visible warning indicator on the detector itself, or through the fire alarm panels infrastructure of sounders and strobes. By the use of a small change in existing firepanel software, a new and enhanced ability is given to existing fire alarm systems to enable them to help combat terrorist threats and to increase the safety and security of building occupants. With the issue of homeland security in the spotlight, this is a simple and effective means that with minimal investment will help protect people from harm due to the deliberate attack by a terrorist group due to the explosion of a "dirty bomb", or an accidental release of radioactive particles.

Americium 241 is a known emitter of Alpha radiation, and as such any radioactive particle that emits Alpha radiation will cause an increase in the ionization chamber current, due to the additional number of ions of air created from the additional Alpha particles. It must be noted, that if a radioactive particle producing Gamma rays or Beta radiation is introduced into the ionization chamber, then this will also cause additional ionization of air molecules, in addition to that of the permanent Americium 241 Alpha source. The above text describes the preferred embodiment of the invention; there are subsequent additional methods that can be employed. One such method is to incorporate into the detector itself, a small radiation sensor that is capable of detecting radioactivity, and/or radioactive particles. There are commercially available "multi" or "combo" detectors that incorporate several sensing methodologies into a single unit. These can be a combination (Photoelectric+Thermal), (Ion+Thermal), and (Photoelectric+Ion+Thermal) all in one package. By adding a radiation sensor to existing smoke detectors, the presence of "extra" radioactive particles or excessive radiation can be detected. In this embodiment, the accurate detection of Alpha, Beta, and Gamma sources could be determined, although the added expense might be prohibitive and result in the use of very few detectors, sparsely placed throughout the building. In the previously described preferred embodiment of the invention, every ionization detector connected to the fire panel is also a radiation detector, or more accurately stated, a radioactive particle detector.

The described invention was described in detailed form with a single ionization chamber for simplicity, but will be used with the more common dual chamber ionization smoke detector design. The dual chamber design will have the advantage of comparing a steady ionization current from the second closed reference ionization chamber, to that of the open ionization chamber. In the case of radioactive particles emitting Alpha, Beta or Gamma radiation, then a clear signal would be given, as the open ionization chamber would have a higher ionization current than that of the reference. Although the detailed description covers commercial fire alarm systems, the described invention is not limited to commercial fire alarm systems. Residential smoke detectors, such as the type that would be available at major retail stores, like Wal-Mart, and Home Depot, would also benefit from this technique of making use of an unexpected increase in ionization chamber current. The internal circuitry would require a software modification to any residential ionization type smoke detector enabling an alarm condition (preferably a unique radiation alarm) to be sounded if the ionization chambers ionization current increased. Until the realization of this patent application, any increase in ionization chamber current would be dealt with as a malfunction or error condition.

An additional technique can be used to add enhanced ability of a smoke detectors ionization chamber to determine additional information about the nature of the smoke particles inside the chamber. By alternating the polarity of the voltage applied to the plates in the ionization chamber at different rates, additional information into the type, size, and concentration of particles contained therein could be added to fine tune the detectors algorithm for determining the type of contaminant to help reduce the possibility of false alarms. This periodic alternating of ionization chamber voltage could be very abrupt and rapid, as in the case of a square wave, or smooth and gradual, as in the case of a sinusoidal or triangular variation in voltage polarity. The frequency of alternation of the polarity could be either fixed or sweeping, (i.e. it can start out with a low frequency, and increase up to a predetermined maximum). The frequency or the polarity reversal could also be a combination of the two. The basic theory is that larger particles will have a characteristic resonance with polarity alteration, than will that of smaller particles. This resonance point will be manifest in the resulting ionization chamber current flow, due to a characteristic dip or peak at a certain frequency. This information could be used to gain information into the size and ionization characteristics of the particles present inside the ionization chamber of the smoke detector. The added information could be used to discern ordinary dust and dirt from that of smoke particulates.

REFERENCE NUMERALS

FIG. 1:

10 DC Voltage source

20 Metal ionization chamber housing with positive connection to voltage source

30 Particle trail of ionizing radioactive source

40 Metal ionization chamber housing (smaller plate) with negative connection to voltage source

50 Ionizing radioactive source

FIG. 2:

10 DC Voltage source

20 Metal ionization chamber housing with positive connection to voltage source

30 Positive ions of air created by interaction of ionizing radioactive source

40 Metal ionization chamber housing (smaller plate) with negative connection to voltage source

50 Ionizing radioactive source

60 Negative ions of air created by interaction of ionizing radioactive source

FIG. 3:

10 DC Voltage source

20 Metal ionization chamber housing with positive connection to voltage source

30 Positive ions of air created by interaction of ionizing radioactive source

40 Metal ionization chamber housing (smaller plate) with negative connection to voltage source

50 Ionizing radioactive source

60 Negative ions of air created by interaction of ionizing radioactive source

70 Small particles of smoke/combustion particles

FIG. 4:

10 DC Voltage source

20 Metal ionization chamber housing with positive connection to voltage source

30 Positive ions of air created by interaction of ionizing radioactive source

40 Metal ionization chamber housing (smaller plate) with negative connection to voltage source

50 Ionizing radioactive source

60 Negative ions of air created by interaction of ionizing radioactive source

70 Small particles of radioactive particles

We claim:

1. A method of utilizing existing ionization smoke detectors to detect for the presence of airborne ionizing radioactive material from a source outside a smoke detectors ionization chamber comprising: monitoring an existing ionization smoke detector's ionization chamber's ionization current response to an increased amount of ionizing radiation inside the chamber or within an 18 inch radius of an existing ionization smoke detector's ionization chamber; wherein, detection is established by determining an increase in the ionization chamber's ionization current from a non-alarm value; wherein, a software modification is made to existing ionization smoke detectors firmware to indicate an increase in the amount of ionization chamber's ionization current which indicates a presence of aerosolized radioactive material.

2. A method of detection as in claim 1, wherein; a software modification is made to an existing firepanel's firmware responsible for monitoring an operation of the existing ionization smoke detector wherein the existing firepanel produces a unique non-fire alarm or non-fire alert condition that differs from a fire alarm to warm of the presence of detected radiological material.

3. A method of detection as in claim 1, wherein; the existing ionization smoke detector is a stand alone unit that produces a unique audible non-fire alarm, unique visual non-fire alarm, or unique audible and visual combination non-fire alarm, distinguishable from that of a fire or smoke detector, indicating airborne radioactive material has been detected by the existing ionization smoke detector.

4. A method of detection as in claim 2, wherein; the existing ionization smoke detector comprises part of a central fire protection system wherein specific detector status information is reported to a hardwired or wireless firepanel in such a manner as to cause a unique non-fire alert or unique non-fire warning from a firepanel indicating aerosolized radioactive material has been detected.

* * * * *